United States Patent Office 2,704,290
Patented Mar. 15, 1955

2,704,290

NEW CLASS OF PHTHALIDE COMPOUNDS AND METHODS OF PREPARING THE SAME

James H. Boothe, Montvale, N. J., and Samuel Kushner, Nanuet, N. Y., assignors to American Cyanamid Company, New York, N. Y., a corporation of Maine No Drawing. Application May 3, 1952,
Serial No. 286,035

14 Claims. (Cl. 260—343.3)

This invention relates to a new class of phthalide compounds and methods of making the same. More particularly this invention relates to a new class of phthalides which can be represented by the following general formula:

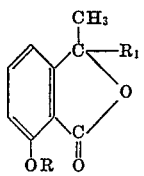

in which R represents hydrogen or a lower alkyl radical, for instance methyl, ethyl and propyl; and $R_1$ represents a halogen substituent, for instance a chloro or bromo substituent; a hydroxy group; or a lower alkoxy group, for instance methoxy or ethoxy.

Compounds of the above formula in which $R_1$ represents a hydroxy group are acidic compounds and the hydroxy group reacts, not as an ordinary hydroxy group, but identical to the hydroxy group in a carboxylic acid. In other words, the hydroxy group can be changed to an alkoxy group by reaction of the hydroxy compound with an alcohol by usual esterification procedures, and the hydroxy group can be replaced by a halogen atom by the usual methods of forming acid halides. In fact, it is quite correct to refer to compounds of the above formula in which $R_1$ represents an alkoxy group as "pseudo-esters" and to compounds of the above formula in which $R_1$ represents halogen as "pseudo-acid halides."

The new compounds of this invention are crystalline solids useful in many fields of organic chemistry. For instance the new compounds of this invention can be employed as intermediates in the preparation of compounds having fungicidal activity as described in co-pending U. S. application S. N. 286,034 filed concurrently herewith.

There is evidence to indicate that compounds of the above general formula in which $R_1$ represents a hydroxy group, exist, at least partially, as the keto isomer which can be represented by the following formula:

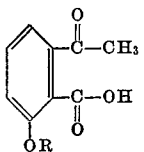

in which R is as defined above. Since, however, a larger number of the characteristics of the new compounds are indicated by the phthalide formula, such a formula is employed in this specification and claims to represent the new class of compounds, even though some of them might exist to some extent in an isomeric form.

While it is not intended that the present invention be limited to the new compounds of the above class when prepared by any one particular method, a convenient method of preparing the new compounds has been discovered and it is intended that this new method also constitute a part of this invention. According to the new method of this invention 2-cyano-3-hydroxy-acetophenone or a 2-cyano-3-alkoxyacetophenone is hydrolyzed in the presence of a hydrolyzing agent to give the corresponding phthalide compound. The new reaction can be more particularly illustrated by the following equation:

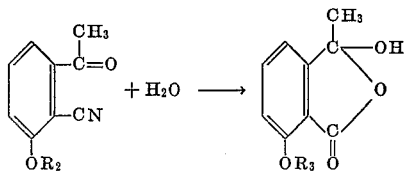

in which $R_2$ and $R_3$ represent hydrogen or lower alkyl radicals. From the free acid, the pseudo-esters and the pseudo-acid halides can be prepared by the usual methods of preparing esters and acid halides, which methods are well known to those skilled in the art. In most instances $R_2$ will be the same as $R_3$ in the above equation, but it is possible, when a very strong hydrolyzing agent such as 48% hydrobromic acid is employed, to have $R_2$ represent alkyl and $R_3$ represent hydrogen. This is because the strong hydrolyzing agent not only results in the hydrolysis of the cyano group, but also results in the hydrolysis of the alkoxy group.

As will be noticed from the above equation, water is a necessary reactant in the new process of this invention. Since water is necessarily present, it is usually advantageous to employ an excess of the same as a solvent or diluent. This results not only in convenient operation, but also in increased yields. Certain water-miscible inert organic solvents, for instance dioxane, or dimethyl-formamide, can also be employed if desired, and in fact, their use is sometimes advantageous since it results in an increased solubility of the acetophenone reactant. Also, certain water-immiscible organic solvents can frequently be employed to advantage. For instance, a reasonable amount of benzene or toluene can be dispersed in the reaction mixture and at the completion of the reaction, the reaction product can be recovered as an organic solution by decantation.

Suitable hydrolyzing agents which can be employed in the new reaction of this invention are the mineral acids and the alkali bases. Suitable mineral acids may be illustrated by hydrochloric acid, hydrobromic acid, sulfuric acid, and phosphoric acid. Suitable alkali bases can be illustrated by sodium hydroxide and postassium hydroxide. Such hydrolyzing agents are effective in catalytic amounts although a large excess is usually advantageous, but of course, the very strong acids, such as sulfuric, should not be employed in such strong concentrations as to result in the possible destruction of the acetophenone reactant or the phthalide reaction product. The preferred hydrolyzing agent is usually 0.5 to 5 normal sodium hydroxide or 2 to 8 normal hydrochloric acid for a simple hydrolysis of the cyano group, but if the hydrolysis of an alkoxy group is also desired, the preferred hydrolyzing agent is 48% hydrobromic acid.

It is an advantage of the new process of this invention that the hydrolysis reaction can be performed over a relatively wide range of temperatures. While the exact temperature range within which the new process can be operated depends upon the particular hydrolyzing agent employed, under favorable conditions the new reaction can be performed at temperatures as low as about 40° C. and at temperatures as high as about 140° C. The reaction is conveniently performed with the more usual hydrolyzing agents, for instance sodium hydroxide and hydrochloric acid at temperatures of from about 40° C. up to the reflux temperature of the reaction mixture. Since, however, the reaction is accelerated by higher temperatures, the preferred range of operation is usually from about 80° C. to the reflux temperature. With strong hydrolyzing agents, such as 48% hydrobromic acid, some care must be exercised if there is an alkoxy substituent present which one does not desire to hydrolyze, and, under these conditions, it is usually advantageous to maintain the operating temperature below about 60° C. If no alkoxy group is present or if an alkoxy group is present and one desires to hydrolyze this group as well as the cyano group, temperatures as high as 140° C. can be employed with the strong hydrolyzing agents.

Typical of hydrolysis reactions, the new reaction of this invention proceeds rather slowly and if a reasonably complete reaction is desired, at least one to four hours should be allowed even under favorable conditions. At lower operating temperatures, for instance 40° C., a correspondingly longer time for a reasonably complete reaction is necessary and from about twenty-four to forty-eight hours should be allowed. As a rule, the reaction proceeds somewhat more rapidly with the alkali base hydrolyzing agents than with the mineral acid hydrolyzing agents.

The invention will be more particularly illustrated by the following examples in which all parts are by weight unless otherwise indicated.

EXAMPLE I

*Preparation of the free acid by alkaline hydrolysis*

A solution of 1 part by weight of 2-cyano-3-methoxyacetophenone in 40 parts by volume of 1 normal aqueous sodium hydroxide is refluxed one hour and then clarified with charcoal, acidified and cooled. The resulting precipitate of 3-hydroxy-3-methyl-7-methoxyphthalide is separated and purified by recrystallization from chloroform.

In place of the 2-cyano-3-methoxyacetophenone employed in the above example, one can employ equal molar quantities of other 2-cyano-3-alkoxyacetophenones or an equal molar quantity of 2-cyano-3-hydroxyacetophenone to produce other 3-hydroxy-3-methyl-7-alkoxyacetophenones or 3-methyl-3,7-dihydroxyacetophenone respectively. For instance, one can prepare 3-hydroxy-3-methyl-7-ethoxyacetophenone by substituting an equal molar quantity of 2-cyano-3-ethoxyacetophenone for the 2-cyano-3-methoxyacetophenone employed in the above example, and one can prepare 3-methyl-3,7-dihydroxyacetophenone by substituting an equal molar quantity of 2-cyano-3-hydroxyacetophenone for the 2-cyano-3-methoxyacetophenone employed above.

EXAMPLE II

*Preparation of the free acid by acid hydrolysis*

A solution of 1 part by weight of 2-cyano-3-methoxyacetophenone in 40 parts by volume of 6 normal hydrochloric acid is refluxed for four hours. The resulting solution is evaporated to dryness in vacuo, a little water added, and then again evaporated to dryness. The resulting solid residue of 3-hydroxy-3-methyl-7-methoxyphthalide is purified by one crystallization from water and two recrystallizations from benzene.

EXAMPLE III

*Preparation of the methyl pseudo-ester*

A solution of 1 part by weight of 3-hydroxy-3-methyl-7-methoxyphthalide is refluxed for one hour in 10 parts by volume of absolute methanol containing 0.2 parts by volume of concentrated sulfuric acid. The resulting solution is cooled, diluted with 30 parts by volume of water and the resulting crystalline product removed by filtration. This 3-methyl-3,7-dimethoxyphthalide is then purified by recrystallization from heptane, followed by recrystallization from a solution of methanol and dilute aqueous sodium bicarbonate.

EXAMPLE IV

*Preparation of the pseudo-acid chloride*

One part by weight of 3-hydroxy-3-methyl-7-methoxyphthalide is stirred in 10 parts by volume of dry benzene containing 1.12 parts by weight of phosphorous pentachloride. After one hour the insoluble material is removed by filtration and the resulting filtrate diluted with 30 parts by volume of dry heptane. After cooling one hour in an ice bath the resulting precipitate of 3-methyl-3-chloro-7-methoxyphthalide is removed by filtration and dried.

The 3-methyl-3-chloro-7-methoxyphthalide prepared by the process of this example acts chemically similar to other acid chlorides. For instance, it reacts quite rapidly with methanol to form the methoxy derivative or, in other words, the pseudo-ester.

We claim:

1. The new phthalide compounds represented by the formula:

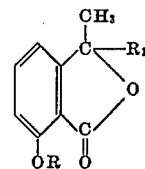

in which R represents a member selected from the group consisting of hydrogen and lower alkyl radicals, and $R_1$ represents a member selected from the group consisting of halogen, hydroxy, and lower alkoxy groups.

2. The 3-hydroxy-3-methoxy-7-(lower alkoxy)phthalides.

3. The new compound 3-methyl-3-hydroxy-7-methoxyphthalide.

4. The new compound 3-methyl-3-hydroxy-7-ethoxyphthalide.

5. The new compound 3-methyl-3,7-dihydroxyphthalide.

6. The 3-methyl-3,7-di(lower alkoxy)phthalides.

7. The new compound 3-methyl-3,7-dimethoxyphthalide.

8. The 3-methyl-3-halo-7-(lower alkoxy)phthalides.

9. 3-methyl-3-chloro-7-methoxyphthalide.

10. A method of preparing compounds represented by the formula:

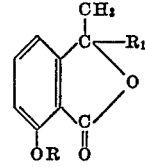

in which R represents a member selected from the group consisting of hydrogen and lower alkyl radicals and $R_1$ represents a member selected from the group consisting of halogen, hydroxy and lower alkoxy groups, which comprises heating with water, at a temperature of from about 40° C. to the reflux temperature of the reaction mixture in the presence of a hydrolyzing agent selected from the group consisting of alkali bases and mineral acids, a compound represented by the formula:

in which R is as defined above.

11. A method of preparing 3-methyl-3-hydroxy-7-lower alkoxy phthalides which comprises heating a 2-cyano-3-lower alkoxy acetophenone with water in the presence of an alkali base and at a temperature of from about 40° C. to the reflux temperature of the reaction mixture.

12. The method of claim 11 wherein said alkali base is 0.5 to 5 normal sodium hydroxide.

13. A method of preparing 3-methyl-3-hydroxy-7-(lower alkoxy)phthalides which comprises heating a 2-cyano-3-(lower alkoxy)acetophenone with water in the presence of a mineral acid and at a temperature of from about 40° C. to the reflux temperature of the reaction mixture.

14. The method of claim 13 wherein said mineral acid is 2 to 8 normal hydrochloric acid.

No references cited.